United States Patent [19]

Scheckenbach et al.

[11] Patent Number: 5,708,089
[45] Date of Patent: Jan. 13, 1998

[54] MIXTURES OF FLUOROPOLYMERS AND OXIDIZED POLYARYLENE SULFIDES

[75] Inventors: Helmut Scheckenbach, Langen; Andreas Schleicher, Einhausen; Jürgen Kulpe, Frankfurt am Main; Bernd Jansen, Emmerting, all of Germany

[73] Assignee: Hoechst AG, Frankfurt, Germany

[21] Appl. No.: 605,400

[22] Filed: Mar. 22, 1996

Related U.S. Application Data

[63] Continuation of Ser. No. 271,839, Jul. 5, 1994, abandoned.

[30] Foreign Application Priority Data

Jul. 10, 1993 [DE] Germany .............. 43 23 181.0

[51] Int. Cl.⁶ .................... C08L 81/00; C08G 75/00
[52] U.S. Cl. .................... 525/189; 525/537
[58] Field of Search ................... 525/189, 537

[56] References Cited

U.S. PATENT DOCUMENTS

| | | | |
|---|---|---|---|
| 3,354,129 | 11/1967 | Edmonds, Jr. et al. | 528/388 |
| 4,395,512 | 7/1983 | Kubota et al. | 524/413 |
| 4,477,630 | 10/1984 | Saito et al. | 525/189 |
| 4,703,076 | 10/1987 | Mori | 524/420 |
| 5,006,594 | 4/1991 | Rees | 524/520 |
| 5,091,463 | 2/1992 | Onishi et al. | 524/508 |
| 5,159,019 | 10/1992 | Yamamoto et al. | 525/189 |

FOREIGN PATENT DOCUMENTS

| | | |
|---|---|---|
| 0 199 991 | 11/1986 | European Pat. Off. . |
| 0 356 948 | 3/1990 | European Pat. Off. . |
| 0 432 911 | 6/1991 | European Pat. Off. . |

*Primary Examiner*—Helen Lee
*Attorney, Agent, or Firm*—Connolly & Hutz

[57] ABSTRACT

Mixtures of fluoropolymers and oxidized polyarylene sulfides

A polymer mixture of

A) at least one fluoropolymer in a proportion of from 50 to 99% by weight and

B) at least one polyarylene sulfone or polyarylene compound containing at least two of the bridges —S—, —SO— and —$SO_2$— or a mixture of the two in a proportion of from 1 to 50% by weight, where the sum of components A) and B) is always 100% by weight.

This mixture is used for the production of sliding bearings or gasket materials having a reduced tendency to creep and reduced abrasion.

21 Claims, No Drawings

MIXTURES OF FLUOROPOLYMERS AND OXIDIZED POLYARYLENE SULFIDES

This application is a continuation of application Ser. No. 08/271,839, filed on Jul. 5, 1994, now abandoned.

The invention relates to mixtures of fluoropolymers and oxidized polyarylene sulfides, in particular polyphenylene sulfones or partially oxidized polyarylene sulfides containing S/SO/S$_2$-bridges, and to their use.

Fluoropolymers have been known for some time. They are distinguished by high heat resistance and excellent chemicals resistance. In addition to the high toughness, both the thermoplastic and the non-thermoplastic fluoropolymers have a pronounced tendency to creep. In addition, the tribological properties of fluoropolymers are inadequate in many applications.

The literature describes additives, for example based on polyester compounds, which either improve the tendency to creep or the abrasion of fluoropolymers (JP-A 58/019397). However, they have the following disadvantages:

1. The polyester compounds decompose at the processing temperatures of the fluoropolymers,
2. the poor grindability of their mixture results in poor homogenization, and
3. the addition of the additives known hitherto considerably decreases the chemicals resistance of the fluoropolymers.

The latter also applies to aromatic polysulfones, (DE-A 24 18 282, JP-A-60/038465). In these cases, polymers are mentioned which are soluble in known organic solvents such as dimethylformamide or dichloromethane.

Also known is a curable mixture of hydrogen peroxide-treated polyphenylene sulfide and a pigment; this mixture contains 13% of polytetrafluoroethylene (U.S. Pat. No. 3,948,865).

It is used for crack-free coating of aluminum which coating can be cured in a short time. In this case, the polytetrafluoroethylene functions only as filler.

It is also known that it is possible to adjust important mechanical properties by means of polymer mixtures. However, reliable prediction of the properties of polymer mixtures is still distant today, so that the mixing of various polymers remains substantially empirical (ref.: T. Stevens, Material Engineering 9 (1990) p.29).

The object was therefore to avoid the disadvantages described in the prior art.

The invention thus relates to a polymer mixture of

A) at least one fluoropolymer in a proportion of from 50 to 99% by weight and

B) at least one polyarylene sulfone or a polyarylene compound containing at least two of the bridges —S—, —SO— and —SO$_2$—, referred to below as S/SO/SO$_2$-compounds, or a mixture of the two in a proportion of from 1 to 50% by weight, where the sum of components A) and B) is always 100% by weight.

It has been found that the addition of polyarylene sulfones and/or S/SO/SO$_2$-arylene compounds to thermoplastic or non-thermoplastic fluoropolymers reduces their tendency to creep and their abrasion while substantially retaining the chemicals resistance and heat resistance. Furthermore, polymer mixtures of this type are distinguished by very good mechanical properties in the tensile test, where particular mention should be made of the elongation at break.

According to the invention, it is possible to use the following fluorothermoplastics containing recurring units of formula (I):

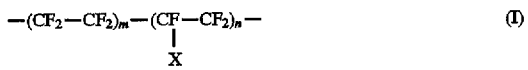

where X is O-R, where R is a perfluorinated alkyl radical having 1 to 8 carbon atoms, end m and n are each a number from 0.01 to 1, where the sum of m and n is 1.

The mixtures can furthermore contain fluorothermoplastics containing recurring units of the formulae (II)–(IV):

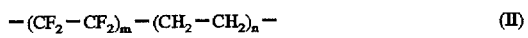

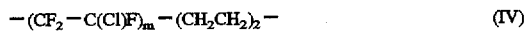

in which m and n are as defined above, and recurring units of the formulae (V) and (VI):

Also suitable for the mixtures according to the invention are non-thermoplastic fluoropolymers containing structural units of the following formulae:

Polymers which can be used for the mixtures according to the invention are linear and branched polyarylenes (Mw: 4000–200 000) whose recurring units contain at least one S and/or SO and/or SO$_2$ group as bridge and which have a heat resistance which is adequate for the fluoropolymers employed in each case, i.e. the two polymers in the mixture are stable under processing conditions. The polyarylenes have the formula (IX)

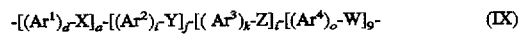

in which each Ar$^1$, Ar$^2$, Ar$^3$, Ar$^4$, W, X, Y and Z, independently of the others, is identical to or different from the others. The indices d, e, i, j, k, l, o and p are, independently of one another, zero or integers 1, 2, 3 or 4, where their sum must be at least 2. Ar$^1$, Ar$^2$, Ar$^3$ and Ar$^4$ in the formula (IX) are simple or directly para-, meta- or ortho-linked arylene systems having 6 to 18 carbon atoms, W, X, Y and Z are linking groups selected from —SO$_2$—, —S—, —SO—, —CO—, —CO$_2$—, alkylene or alkylidene groups, each having 1–6 carbon atoms, and -NR$^1$-groups where R$^1$ is an alkyl or alkylidene group having 1–6 carbon atoms. Excluded from this group are polymers from the class consisting of the polyether sulfones.

Particularly suitable polymers are polyarylenes containing recurring units of the formula (X):

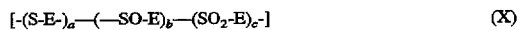

in which each E, independently of the others, is phenylene, naphthylene or biphenylene, b and c, independently of one another, have values of from 0 to 1 and a has values of from 0 to less than 1, with the proviso that the sum a+b+c is equal to 1 and at least two of the indices are greater than zero.

Polymers which can be specifically employed are those containing recurring units of formulae (XI)–(XIII)

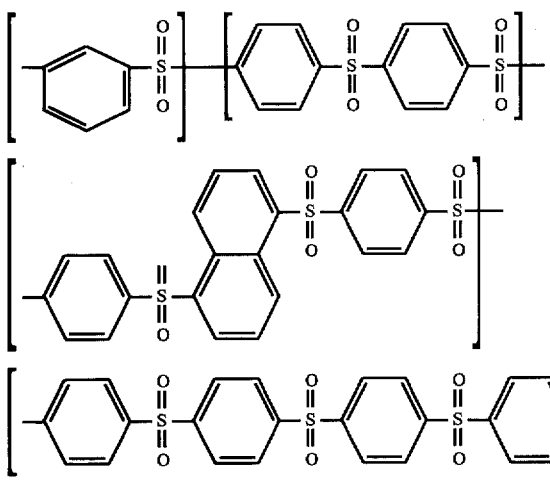

and oxidized polyphenylene sulfides containing recurring units of the formula (XIV)

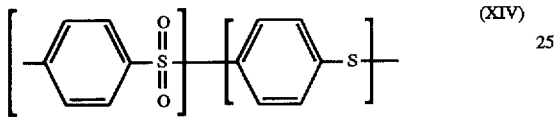

where the sulfone content is at least 65%.

The oxidized polyarylene sulfides are prepared by the processes described in (as yet unpublished) German patent applications P 43 14 737.2 ("Two-step oxidation of polyarylene sulfides which corresponds to U.S. Ser. No. 08/237,271") and P 43 14 738.0 ("Process for the oxidation of polyarylene compounds containing thio-ether groups") of May 4, 1993, which corresponds to U.S. Ser. No. 08/237,272 which are expressly incorporated herein by way of reference.

The particle size of the oxidized polyarylene sulfides according to the invention is generally from $3 \cdot 10^{-6}$ to $300 \cdot 10^{-6}$ m, preferably from $5 \cdot 10^{-6}$ to $100 \cdot 10^{-6}$ m, in particular from $5 \cdot 10^{-6}$ to $50 \cdot 10^{-6}$ m.

The proportion of polyarylene sulfones or S/SO/SO$_2$-arylene compounds is from 1 to 50% by weight, preferably from 2 to 40% by weight, in particular from 3 to 30% by weight; the proportion of fluoropolymers is from 50 to 99% by weight, preferably from 60 to 98% by weight, in particular from 70 to 97% by weight, where the proportions of the two polymers, based on the entire polymer mixture, add up to 100%. The mixtures according to the invention can contain one or more fluoropolymers and at least one polyarylene sulfone and/or S/SO/SO$_2$-arylene compound and modified fluoropolymers, modified polyarylene sulfones or modified S/SO/SO$_2$-arylene copolymers. If the fluoropolymers are thermoplastic, the mixtures according to the invention are prepared and processed by standard methods known for thermoplastics, for example by compounding, blow molding, extrusion, compression molding or injection molding. In the case of non-thermoplastic fluoropolymers, the mixtures according to the invention are prepared and processed by standard methods such as transfer molding, ram extrusion, hot pressing, cold pressing with subsequent sintering.

The mixtures according to the invention can contain conventional additives, for example heat stabilizers, UV stabilizers, antistatics, flameproofing agents, dyes, pigments and inorganic and organic fillers.

They are advantageously employed as materials in applications where high heat distortion resistance and/or chemicals resistance together with adequate toughness are required, for example as sliding bearings or gasket materials.

EXAMPLES

1. Mixtures of fluoropolymer and polyphenylene sulfone

A) Polyphenylene sulfone 833 g of polyphenylene sulfide powder (diameter 20 μm) having a glass transition temperature Tg of 94° C. and a melting point Tm of 290° C. were introduced into 2.91 of glacial acetic acid at 55° C., 16 ml of conc. sulfuric acid were added, and 616 g of hydrogen peroxide (87%) were added dropwise at constant temperature. After a subsequent stirring time of 3 hours at from 58° to 65° C. and 1½ hours at 80° C., the reaction solution was cooled, and the solid product was filtered off with suction at 50° C., washed with water and dried. Yield: 998 g (93%); DSC (differential scanning calorimetry) data: Tg: 352° C.; Tm: 520° C. (decomposition).

Elemental analysis: $(C_6H_4SO_2)_n$ calc.: C 51.42% H 2.88% S 22.87% found: C 51.35% H 2.90% S 22.75%

B) The fluoropolymer had the following properties:

density d=2.16 g/cm$^3$; Mw (mean molecular weight): $10^7$; diameter 20 μm (®Hostaflon TF 1750, Hoechst AG, Frankfurt a.M., Germany).

Powders of the two polymers (parts by weight data, see table) were first mixed and subsequently cold-pressed on a hydraulic press at pressures corresponding to their composition (90:10/350 bar; 80:20/500 bar, cf. table) to give samples having a diameter of 65 mm and a height of 60 mm. This was followed by linear heating at 45 K/hour from room temperature to 375° C. The samples were then subjected to this temperature for a further 4 hours. The subsequent cooling to room temperature was likewise carried out at 45 K/hour. Test specimens were produced from these samples by machining and subjected to the tests listed in the table. The values obtained are also shown. Also prepared was a mixture in which component A was replaced by a commercially available polyarylate (®Isaryl 15, Isonova, Vienna, Austria).

TABLE 1

Properties of PTFE mixtures

| Mixture B: A(T) | 100:0 | 90:10 | 80:20 | 90 B: 10 Isaryl 15[1) |
|---|---|---|---|---|
| Density [g/cm³] | 2.16 | 2.05 | 1.93 | — |
| Tensile strength, break [MPa][2) | 40[4) | 19 | 12 | |
| Elongation at break [%][2) | 450[4) | 460 | 315 | |
| Abrasion, steel [mg][3) | >50 | 4 | — | 37 |
| Abrasion, gray iron [mg][3) | >360[5) | 3 | 5 | 93 |

[1)Comparison
[2)Tensile strength, break/elongation at break in accordance with ASTM D1457 and ASTM D4895 respectively
Type 81801 tensile tester from Frank (Weinheim, Germany)
[3)The abrasion tests were carried out by the method of H. Ruck, Der Konstrukteur 1-2/93 (1993) 64–66.
Conditions:
Test atmosphere: Air
Test specimens: Diameter 10 mm, height 20 mm
Pressure: 0.42 N/mm²
Sliding speed: 4 m/s
Sliding partner: gray iron 30
steel X20Cd13
Test time: 100 h test run
Test temperature: 100° C.
Test distance: 1436 km
[4)Values relate to sliced films
[5)Value relates to 3 hours 2. The abrasion in Examples 2.1 and 2.2 below was determined by means of a roller abrasion instrument (of our own design). The test specimen presses at 1N/mm² against a thermostatted (50° C.) roller rotating at 365 rpm (material: pearlite iron type GGG 60; external diameter: 105.7 mm; length: 240 mm; roughness: about 1.5μ).

The samples were produced by hot-pressing the polymers and polymer mixtures to give cylindrical blocks having a diameter of 45 mm and a height of 30 mm, which were finally machined down to a diameter of 8 mm. The hot-pressing conditions are shown in Table 2. The abrasion is calculated from the quotient of abrasion volume [mm³] and the product of distance [m] and load [N].

TABLE 2

Hot-pressing conditions

| | Example 2.1 | Example 2.2 |
|---|---|---|
| Temperature/°C. | | |
| Material | 340 | 275 |
| Mold | 340 | 275 |
| Specific pressing pressure/bar | 250 | 250 |
| Pressing time/h | 1 | 2 |

2.1. The abrasion of pure tetrafluoroethylene-perfluoroalkyl vinyl ether copolymer having the composition 95.2% of tetrafluoroethylene, 3.6% of perfluoroalkyl vinyl ether and 1.2% of hexafluoropropylene units and a mixture of 90 parts by weight of the fluoropolymer and 10 parts by weight of polyphenylene sulfone (powder D$_{50}$: 20 μm; prepared as described in Example 1) was determined as above (Table 3).

TABLE 3

| Material | Abrasion [mm³/Nm] |
|---|---|
| Fluoropolymer | 6600 · 10⁻⁷ |
| Fluoropolymer/polyphenylene sulfone, 90:10 (w/w) | 473 · 10⁻⁷ |

2.2 The abrasion of pure tetrafluoroethylene-ethylene copolymer having the composition 75.5% of tetrafluoroethylene units, 21.0% of ethylene units and 3.5% of perfluorobutylethylene units and mixtures of the fluoropolymer and polyphenylene sulfone (powder (D$_{50}$): 20 μm; prepared as described in Example 1) were determined as above (Table 4).

TABLE 4

| Material | Abrasion [mm³/Nm] |
|---|---|
| Fluoropolymer | 958 · 10⁻⁷ |
| Fluoropolymer/polyphenylene sulfone, 95:5 (w/w) | 180 · 10⁻⁷ |
| Fluoropolymer/polyphenylene sulfone, 80:20 (w/w) | 110 · 10⁻⁷ |

The examples show that the abrasion of fluoropolymers is significantly reduced by addition of polyphenylene sulfone.

We claim:

1. A polymer mixture which consists essentially of
   A) at least one fluoropolymer in a proportion of from 50 to 99% by weight and
   B) at least one polyarylene sulfone or polyarylene compound containing at least one of the bridges —SO— or —SO$_2$— or a mixture of the two in a proportion of from 1 to 50% by weight, where the sum of components A) and B) is always 100% by weight, and said polymer mixture has a sulfone content of at least 65%.

2. A polymer mixture as claimed in claim 1, wherein the proportion of component A) is from 60 to 98% by weight and the proportion of component B) is from 2 to 40% by weight.

3. A polymer mixture as claimed in claim 1, wherein component A) contains one of the recurring units of the formulae (I) to (VIII):

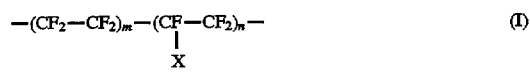

(I)

(II)

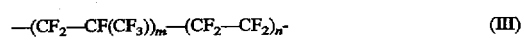

(III)

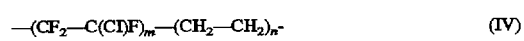

(IV)

(V)

(VI)

(VII)

(VIII)

where, in the formula (I), X is O-R, where R is a perfluorinated C$_1$-C$_8$-alkyl radical, and, in the formulae (I) to (IV), m and n are each numbers from 0.01 to 1, where the sum of m and n is 1.

4. A polymer mixture as claimed in claim 1, wherein component B) is a linear or branched polyarylene system (Mw:4000–200,000) containing the recurring unit of the formula (IX)

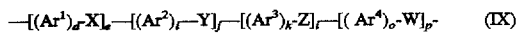

which contains at least one S and/or SO and/or $SO_2$ group as bridge, where each $Ar^1$, $Ar^2$, $Ar^3$, $Ar^4$, W, X, Y and Z, independently of the others, is identical to or different from the others, the indices d, e, i, j, k, l, o and p, independently of one another, are zero or integers 1, 2, 3 or 4, where their sum must be at least 2, $Ar^1$, $Ar^2$, $Ar^3$ and $Ar^4$ in the formula (IX) are simple or directly para-, meta- or ortho-linked arylene systems having 6 to 18 carbon atoms, W, X, Y and Z are linking groups selected from $-SO_2-$, $-S-$, $-SO-$, $-CO-$, $-CO_2-$, alkylene or alkylidene groups, each having 1–6 carbon atoms, and $NR^1$ groups, where $R^1$ is an alkyl or alkylidene group having 1–6 carbon atoms, with the proviso that polymers from the class consisting of polyether sulfones are excluded.

5. A polymer mixture as claimed in claim 1, wherein component B) is a polyarylene containing recurring units of the formula (X):

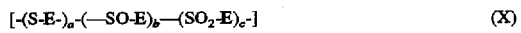

in which each E, independently of the others, is phenylene, naphthylene or biphenylene, b and c, independently of one another, have values of from 0 to 1, and a has values of from 0 to less than 1, with the proviso that the sum a+b+c is 1 and at least two of the indices are greater than zero.

6. A polymer mixture as claimed in claim 1, wherein component B) is a polymer containing recurring units of the formulae (XI)–(XIII)

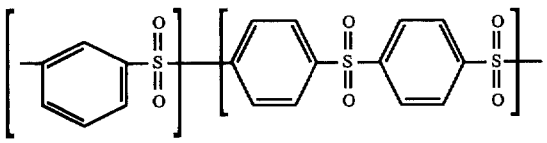

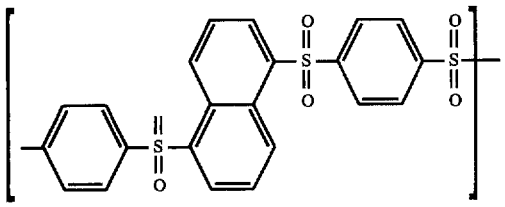

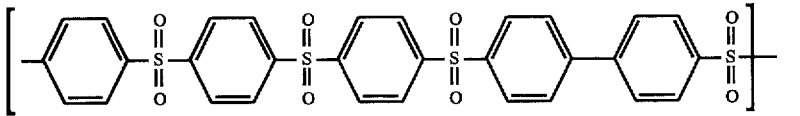

7. A polymer mixture as claimed in claim 5, wherein component B) is an oxidized polyphenylene sulfide containing recurring units of the formula (XIV)

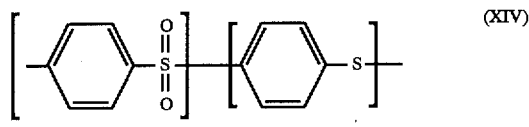

where the sulfone content is at least 65%.

8. A polymer mixture as claimed in claim 1, wherein said component B) has a particle size from $3 \cdot 10^{-6}$ to $300 \cdot 10^{-6}$ m.

9. A polymer mixture as claimed in claim 1, additionally contains heat stabilizers, UV stabilizers, antistatics, flame-proofing agents, dyes, pigments and inorganic or organic fillers.

10. A molding made from a polymer mixture as claimed in claim 1.

11. A molding as claimed in claim 10 in the form of a sliding bearing or gasket material.

12. A polymer mixture as claimed in claim 1, wherein component B) further comprises at least one bridge of $-S-$.

13. The polymer mixture as claimed in claim 1, wherein said component B) contains at least one $-SO-$ bridge.

14. The polymer mixture as claimed in claim 1, wherein component A) is present in an amount from 70 to 97% by weight and component B) is present in an amount from 3 to 30% by weight.

15. The polymer mixture as claimed in claim 1, wherein polyethersulfones are excluded.

16. A copolymer mixture which consists of
   A) at least one fluoropolymer in a proportion of from 50 to 99% by weight and
   B) at least one polyarylene sulfone or polyarylene compound containing at least two different bridges selected from the group consisting of $-S-$, $-SO-$ and $-SO_2-$ in a proportion of from 1 to 50% by weight where the sum of components A) and B) is always 100% by weight.

17. The copolymer as claimed in claim 16, wherein said component B) contains at least one $-SO-$ bridge.

18. The copolymer as claimed in claim 16, wherein component A) is present in an amount from 70 to 97% by weight and component B) is present in an amount from 3 to 30% by weight.

19. A polymer mixture which consists essentially of
   A) at least one fluoropolymer in a proportion of from 70 to 99% by weight and
   B) at least one polyarylene sulfone or polyarylene compound containing at least one of the bridges —SO— or —SO$_2$— or a mixture of the two in a proportion of from 1 to 30% by weight, where the sum of components A) and B) is always 100% by weight and said polymer mixture has a sulfone content of at least 65%.

20. The polymer mixture as claimed in claim 19, wherein said component B) contains at least one —SO— bridge.

21. The polymer mixture as claimed in claim 19, wherein component B) further comprises at least one bridge of —S—.

* * * * *